No. 811,181. PATENTED JAN. 30, 1906.
L. STERNE.
GAS COMPRESSOR.
APPLICATION FILED AUG. 18, 1904.
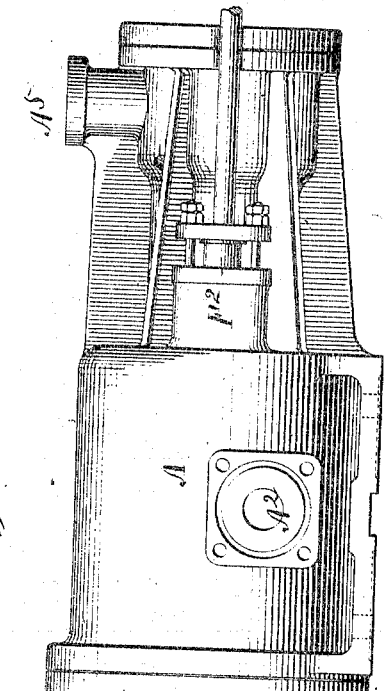
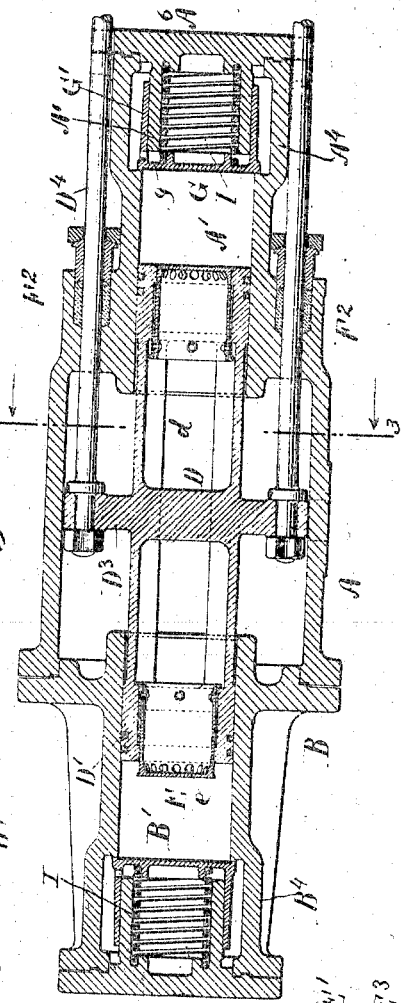
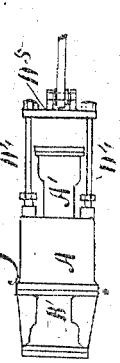
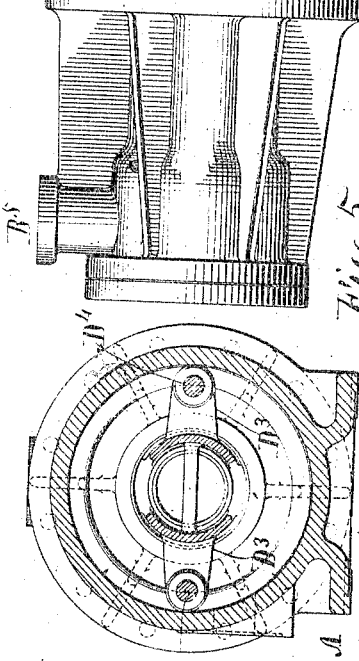
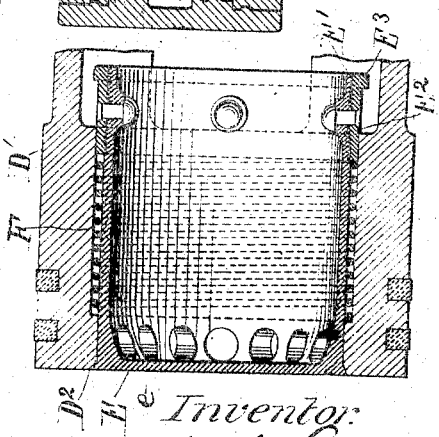
Witnesses:
Inventor:

UNITED STATES PATENT OFFICE.

LOUIS STERNE, OF LONDON, ENGLAND.

GAS-COMPRESSOR.

No. 811,181.　　　Specification of Letters Patent.　　　Patented Jan. 30, 1906.

Application filed August 18, 1904. Serial No. 221,279.

*To all whom it may concern:*

Be it known that I, LOUIS STERNE, a citizen of the United States, residing at Donington House, London, England, have invented a certain new and useful Improvement in Gas-Compressors, of which the following is a specification.

The improvement is intended more especially for compressing ammonia-gas to be used in refrigerating, and I will describe the invention as thus applied.

In the accompanying drawings, Figure 1 is a side elevation of such a gas-compressor, embodying the invention in what is considered the best mode of applying the principle thereof. Fig. 2 is a central horizontal section of the same. Fig. 3 is a cross-section on line 3 3 of Fig. 2. Fig. 4 is a longitudinal section, on a larger scale, of one of the valved pistons of said compressor; and Fig. 5 is a plan, on a smaller scale, of the compressor, including an operating cross-head not shown in Figs. 1 and 2.

The central portion of the compressor consists of a gas-tight casing A, provided with a return-gas inlet $A^2$ for the reception of the cold gaseous ammonia to be compressed. At opposite ends of this casing and interconnected thereby are two compressor-cylinders A' B', closed at their outer ends only, their respective open ends being turned inward, or, in other words, toward the center of said casing A. The cylinders are arranged tandem—that is to say, in line with each other. Most advantageously the adjacent inner ends of the cylinders are interconnected by forming the cylinder A' integral with said casing and securing the cylinder B' to the latter by means of the annular head B, as shown in Fig. 2. On the casing A are shown extended feet, Figs. 1 and 3, for supporting the compressor on a suitable bed. (Not shown.)

At the outer end of each cylinder is a delivery-valve, which is most advantageously placed in an enlargement $A^4$ $B^4$, respectively, of the corresponding cylinder and is most advantageously composed of a stout plate G, and a cylindrical extension or body G', which fits over and is guided by the annular lip $A^7$ on the cylinder-head $A^6$. Housed within this lip $A^7$ is a helical spring I, which abuts against the plate $A^6$ and urges the valve G G' to its seat. Apertures $g$ in the valve-body G' equalize the pressures inside and outside of the valve.

A suitably-packed piston D' (most advantageously a hollow or trunk piston, as shown,) works in each cylinder and is provided with a suction-valve which is most advantageously composed of a head E and a hollow cylindrical body E', attached thereto, with apertures $e$ near the junction. The valve-body E' fits within and is guided by the piston, which is apertured to allow the gas from the casing A to flow to and through the valve. An external flange $D^2$ on the valve seats itself in a recess in the end of the piston when the valve closes. This is drawn to its seat by the aid of a helical spring F, surrounding the valve-body E' and interposed between an internal shoulder on the piston and the ring $E^2$ on the valve. A flange $E^3$ on ring $E^2$ forms a stop to limit the movement of the valve in opening.

The two pistons are united to each other by an interposed connection in the casing A, and they are advantageously made in one piece of metal. It is also an advantage to make the connection D hollow, with side openings $d$ for ingress of the cold return gas to be compressed and with the walls of said connection, approximately at least, in line with the walls of the hollow or trunk pistons D'.

The pistons D' are operated by means of rods $D^4$ reciprocating endwise in lateral stuffing-boxes $F^2$ at one end of the casing A. With the object of effecting this arrangement the casing A is made of larger diameter than the cylinders interconnected thereby, the extension of the casing laterally beyond the cylinder A' giving room outside said cylinder for the piston-rods $D^4$, Figs. 1 and 5. As shown in Fig. 5, they are connected at their outer ends with the cross-head $D^5$ for receiving motion from a steam-engine or other operating motor. (Not shown.)

The piston-rods $D^4$ are connected with the pistons D' inside the casing A by means of the radial arms $D^3$ on the interposed connection D.

When the piston-rods $D^4$ are reciprocated, they reciprocate the pistons D' and the interposed connection D, so that at the inward movement of each piston D' the cold return gas is sucked directly from casing A (wherein it surrounds the said parts) into the corresponding cylinder through the openings $d$ and the interiors of hollow connection D and hollow piston D' past the suction-valve E E' and on the outward piston movement the gas in said cylinder A' or B' is compressed and discharged past the delivery-valve G G' and through the corresponding nozzle A⁵ or B⁵. The two single-acting cylinders A' B' together constitute a double-acting compressor, a delivery of compressed gas taking place at one or other of the nozzles A⁵ B⁵ at each motion of the pistons D' and their interposed connection D in each direction. The cylinders A' B' are also each of them single stage, receiving the cold return gas directly from the casing A and delivering it after one compression to the corresponding nozzle A⁵ or B⁵. Thus compression in each half of each reciprocation is effected by piston-rods D⁴ and pistons D' and interposed connection D, which are all of them kept at a moderate uniform low temperature by the extended contact of the cold return gas of casing A with the surfaces of said parts. Moreover, the flow of the return gas from casing A into each of the cylinders tends to carry into each of them the lubricant which the endwise reciprocation of the rods D⁴ tends to carry into the casing A from the stuffing-boxes F². The compressor is thus economical of lubrication as well as of manufacture. It is well adapted to run at high speed in consequence of the balance of moving parts united with their uniform moderate low temperature. It is strong and not liable to get out of order.

The particular construction of the connection D, integral with the pistons D' and hollow with side openings and with walls, approximately at least, in line with the walls of the hollow or trunk pistons, furnishes great rigidity and economy of manufacture along with a direct exposure of extended surfaces to the cold return gas and an uninterrupted conduction of heat between the pistons and interposed connection, and this particular construction is regarded as a special improvement, which is particularly pointed out and claimed as an element in the third of the hereinafter-written claims.

The machine may be worked in an upright position or variously inclined instead of horizontal. The springs of the valves could be given more force when they oppose and less when they coact with gravity.

I claim as my invention or discovery—

1. A double-acting gas-compressor, composed of two tandem single-acting single-stage compressor-cylinders, each having a delivery-valve at its outer end, a gas-tight casing of larger diameter connecting the adjacent inner ends of the cylinders, a return-gas inlet to the casing, two connected hollow trunk-pistons working in the respective cylinders, each such piston carrying a suction-valve and apertured to afford communication between the casing and the valve, radial arms on the pistons, and piston-rods connected to the arms and passing through lateral stuffing-boxes at one end of the casing, whereby the cylinders, pistons and piston-rods are kept at a moderate uniform low temperature.

2. A double-acting gas-compressor, composed of a gas-tight casing provided with a return-gas inlet, compressor-cylinders closed at their outer ends only and there provided with delivery-valves and arranged in line with each other at opposite ends of said casing with their respective open ends turned toward the center of said casing, pistons provided with suction-valves and united to each other by an interposed connection in said casing, each of said pistons working in the corresponding compression-cylinder and each admitting the gas through its interior directly into such cylinder from said casing, and piston-rods connected inside said casing with said pistons and reciprocating endwise in stuffing-boxes on said casing, substantially as described.

3. A double-acting gas-compressor, composed of a gas-tight casing provided with a return-gas inlet, compressor-cylinders closed at their outer ends only and there provided with delivery-valves and arranged in line with each other at opposite ends of said casing with their respective open ends turned toward the center of said casing, hollow trunk-pistons provided with suction-valves and united to each other by an interposed integrally-formed open-sided hollow connection in said casing, each of said pistons working in the corresponding compression-cylinder and each admitting the gas through its interior directly into such cylinder from said casing, and the walls of said hollow connection being in line with the walls of said hollow trunk-pistons, and piston-rods connected inside said casing with said pistons and reciprocating endwise in stuffing-boxes on said casing, substantially as described.

In testimony that I claim the invention above set forth I affix my signature in presence of two witnesses.

LOUIS STERNE.

Witnesses:
R. WESTACOTT,
FREDK. L. RAND.